Jan. 21, 1958     C. A. GRULKE ET AL     2,820,730
PRIMARY BATTERY WITH CONTROLLABLE CATHODE POTENTIAL
Filed April 30, 1954
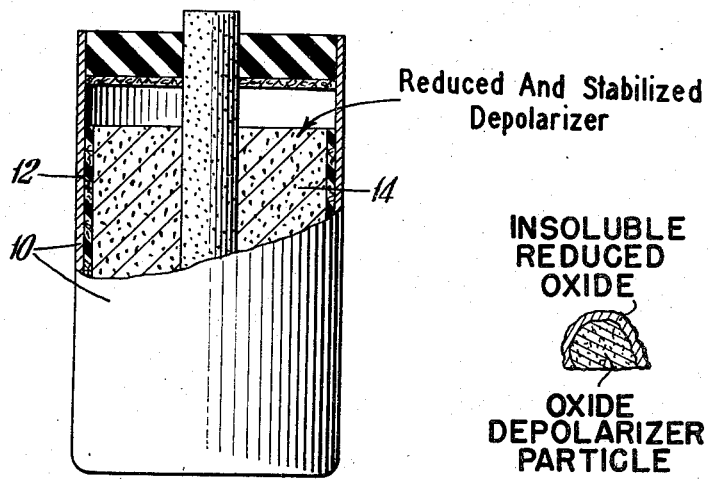
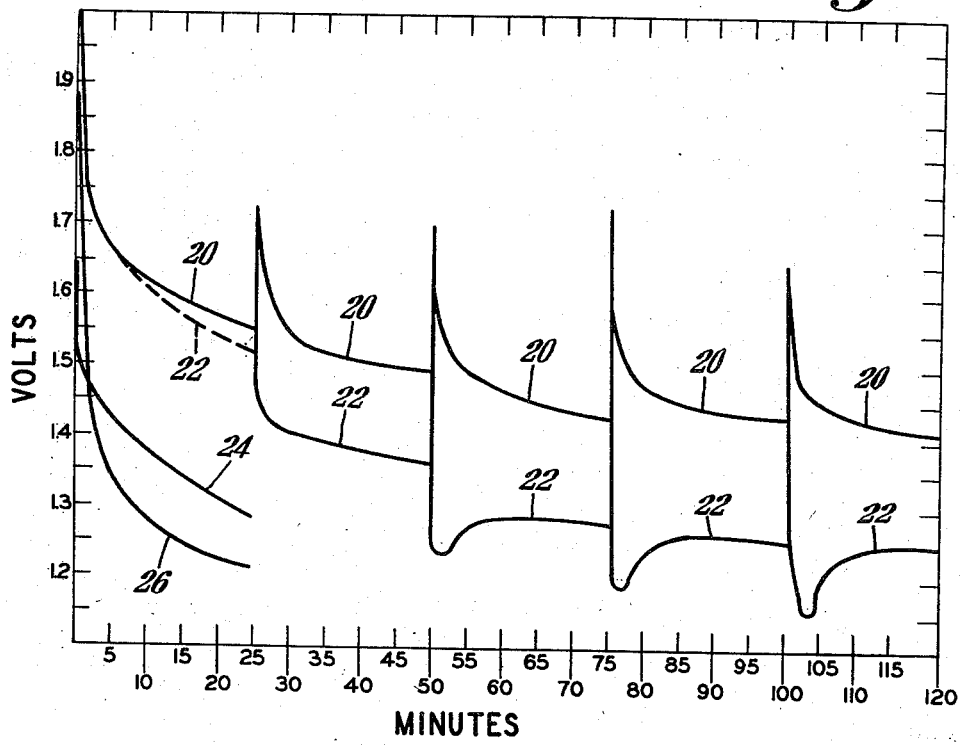
INVENTORS
CARL A. GRULKE
RUSSELL P. FOX
BY *John F. Hohmann*
ATTORNEY

United States Patent Office 2,820,730
Patented Jan. 21, 1958

2,820,730

PRIMARY BATTERY WITH CONTROLLABLE CATHODE POTENTIAL

Carl A. Grulke, Berea, and Russell P. Fox, Fairview Park, Ohio, assignors to Union Carbide Corporation, a corporation of New York Application April 30, 1954, Serial No. 426,853

5 Claims. (Cl. 136—139)

This invention relates to a method for controlling the voltage range of primary galvanic cells utilizing oxidic depolarizers.

Primary galvanic cells utilizing oxidic depolarizers and having metals other than zinc for their anodes are of rapidly growing interest because of the scarcity of zinc metal and of the different voltage characteristics such as the flatness of the latter portion of the discharge curve obtainable by their use. Before a cell such as the magnesium cell can be used interchangeably with the commercial zinc cell, it is necessary to reduce its initial voltage to that of the zinc cell, as failure to do so results in rapid deterioration and unnecessary loss of efficiency, for example in the use of battery-operated electronic equipment.

Previous work indicates that simple external voltage control methods were incapable of rendering cells interchangeable. Previous attempts to replace zinc electrodes by magnesium electrodes using either dropping resistors or modifying centering voltage of the equipment have all been basically impractical, because the high peak voltage and its consequent inherent power loss has resulted invariably in reducing the effective service output.

The present invention has for principal object a primary cell having controllable cathode potential which permits the obtaining of desired initial voltages. Its further object is to provide a magnesium cell having essentially the same initial voltage as the commercial zinc cell while retaining its characteristic higher voltage level during the final portion of service. Within the term "magnesium" are included suitable alloys of magnesium with metals placed near it on the electromotive series, as, for example, an alloy containing 2% of aluminum and 2% of manganese. Accordingly, whenever magnesium is mentioned in the present invention, the term should be understood to include similarly suitable alloys as well as the essentially pure metal itself.

As the initial voltage of a cell is controlled by the surface potential of the depolarizing ore particles, the objects of this invention are attained by controlling and stabilizing the reduction of the ore on the surface of these particles by subsequent reaction at a controlled pH. In the practice of the invention, this surface treatment is achieved by heat treating in a reducing atmosphere under specified conditions. Desired operating characteristics are then obtained by so regulating the pH of the depolarizing mix as to form on the depolarizing ore surface an external coating of lower oxides having a relatively lower potential.

In the drawings, Fig. 1 is a sectional elevational view of an embodiment of this invention. Fig. 2 is a graph showing typical voltage curves for such a cell. Fig. 3 is an enlarged cross-sectional view of an individual oxidic depolarizing particle coated according to the present invention.

The normal magnesium cell using a magnesium bromide electrolyte operates at an initial voltage approximately 0.3–0.5 volt higher than the commercial zinc cell when the depolarizing mix in the latter has a pH of approximately 5.1. As an example of the practice of this invention, the operating voltage of the cell was reduced by 0.3–0.5 volt by the following procedure.

The manganese dioxide depolarizing ore was subjected to the reducing action of methane gas at a temperature of 350° C.–450° C. in a suitable oven until it gave the potential of $Mn_2O_3$ when dispersed in the electrolyte, although the manganese dioxide content was reduced only by 2 to 4%. The pH of the cell mix was increased to 8.1 by the addition of 1 gram of magnesium oxide per 50 grams of depolarizing ore to maintain the reduced potential. This mixture was incorporated in a cell identical with the one shown in Fig. 1, wherein magnesium electrode 10 serves as the anodic material; a separator means 12 lies between the cathode mix and the anode, a carbon collector forms with the depolarizing mix, the cell cathode 14 and magnesium bromide serves as the electrolyte. A cell using the depolarizing mix of this invention may be vented in any way desirable.

This cell was tested initially upon assembly by continuously discharging on a 4 ohm load for 25 minutes daily for 5 consecutive days. It will be noted from the graph curves that its initial voltage approximated that of the commercial zinc cell, while attaining a desired flatness in the latter portion of its discharge.

Curve 20 indicates the voltage characteristics of a standard magnesium cell. Curve 22 shows voltage characteristics for the system $\frac{1}{2}MnO_2 \cdot \frac{1}{2}Mn_2O_3$. Curves 24 and 26, of which only the initial parts are shown, illustrate the voltage characteristics of a comparable zinc cell and of a cell having a depolarizer consisting of $Mn_2O_3$, respectively.

The thickness of the surface layer reduced to the lower potential $Mn_2O_3$ can be controlled by regulating the ore feed, the amount of reducing gas and the reaction temperature. Accordingly, the degree of reduction of the initial voltage can be regulated with regard to the depth of the surface treatment and with respect to the degree of reduction of the manganese dioxide on the surface. pH control amy be achieved in any known manner as, for example, by the addition of ammonium hydroxide or manganese oxide. In addition to methane, other suitable reducing gases such as carbon monoxide, hydrogen and mixtures thereof, also may be conveniently used.

While this invention has been specifically described with respect to making a cell using a magnesium anode substantially equal in voltage to a cell employing a zinc anode, its method generally is equally applicable to rendering interchangeable cells having other anodes.

Related subject matter is disclosed and claimed in our co-pending applications, Serial Numbers 426,854 and 426,855.

What is claimed is:

1. A process for controlling the voltage range of primary galvanic cells having oxidic depolarizers comprising reducing the active surface of the oxidic ore by subjecting it to a reducing atmosphere, and heat, and controlling the pH value of the mix.

2. A process for controlling the voltage range of primary galvanic cells having manganese dioxide depolarizers comprising reducing the active surface of the manganese dioxide by subjecting it to a reducing atmosphere at a temperature range of 350° to 450° C., converting said surface to that of $Mn_2O_3$ and stabilizing it by pH control of the cell mix.

3. A process for controlling the voltage range of primary galvanic cells having manganese dioxide depolarizers comprising reducing the active surface of the manganese dioxide by subjecting it to a reducing atmosphere consisting of at least one gas selected from the group consisting of methane, carbon monoxide, and hydrogen at a temperature range of 350° to 450° C., converting said surface to $Mn_2O_3$, and stabilizing it by pH control of the cell mix.

4. A depolarizing mix for primary galvanic cells, comprising particles of an oxidic ore, each particle having a discrete surface coating of a reduced, lower potential form of said ore, said mix being adapted for use in conjunction with various anodes and electrolytes to obtain desired initial voltage characteristics in said galvanic cells.

5. A depolarizing mix comprising manganese dioxide particles, each particle having a discrete surface coating consisting of a reduced form of manganese dioxide, said mix being adapted for use in conjunction with a magnesium anode to give initial voltage characteristics similar to those of a commercial zinc cell.

References Cited in the file of this patent

UNITED STATES PATENTS

| | | |
|---|---|---|
| 1,160,907 | Koretzsky | Nov. 16, 1915 |
| 1,221,062 | Kaplan | Apr. 3, 1917 |
| 1,951,342 | Bradley et al. | Mar. 20, 1934 |
| 2,547,907 | Fry et al. | Apr. 3, 1951 |
| 2,678,343 | Daniel | May 11, 1954 |

OTHER REFERENCES

Transactions Electrochemical Society, vol. 68, pp. 177–184.

Transactions Electrochemical Society, vol. 53, pp. 83–92.

Vinal, G. W.: "Primary Batteries," John Wiley & Son, New York, 1950, ed. 3, pp. 70–71.